(12) United States Patent
Gierak et al.

(10) Patent No.: US 11,993,402 B2
(45) Date of Patent: May 28, 2024

(54) ION PROPULSION DEVICE

(71) Applicants: CENTRE NATIONAL DE LA RECHERCHE SCIENTIFIQUE, Paris (FR); CENTRE NATIONAL D'ETUDES SPATIALES, Paris (FR); UNIVERSITE PARIS-SACLAY, Gif-sur-Yvette (FR)

(72) Inventors: Jacques Gierak, Le Plessis-Pate (FR); Claude Boniface, Nailloux (FR); Mathieu Lepesant, Valdalliere (FR)

(73) Assignees: CENTRE NATIONAL DE LA RECHERCHE SCIENTIFIQUE, Paris (FR); CENTRE NATIONAL D'ETUDES SPATIALES, Paris (FR); UNIVERSITE PARIS-SACLAY, Gif-sur-Yvette (FR)

( * ) Notice: Subject to any disclaimer, the term of this patent is extended or adjusted under 35 U.S.C. 154(b) by 127 days.

(21) Appl. No.: 17/762,303

(22) PCT Filed: Sep. 22, 2020

(86) PCT No.: PCT/EP2020/076418
§ 371 (c)(1),
(2) Date: Mar. 21, 2022

(87) PCT Pub. No.: WO2021/063750
PCT Pub. Date: Apr. 8, 2021

(65) Prior Publication Data
US 2022/0348361 A1 Nov. 3, 2022

(30) Foreign Application Priority Data
Sep. 30, 2019 (FR) ...................................... 1910805

(51) Int. Cl.
*B64G 1/40* (2006.01)
*H01J 27/26* (2006.01)
(52) U.S. Cl.
CPC .............. *B64G 1/405* (2013.01); *H01J 27/26* (2013.01); *H01J 2237/0802* (2013.01); *H01J 2237/317* (2013.01)
(58) Field of Classification Search
CPC ... H01J 27/26; H01J 2237/0802; F03H 1/005; F03H 1/025
See application file for complete search history.

(56) References Cited

U.S. PATENT DOCUMENTS

| 7,827,779 B1 | 11/2010 | Krishnan et al. |
| 2006/0049347 A1* | 3/2006 | Joyce ..................... B82Y 10/00 250/288 |

(Continued)

FOREIGN PATENT DOCUMENTS

CN 109204888 A 1/2019

OTHER PUBLICATIONS

Krpoun "Microfabrication and Test of an Integrated Colloid Thruster" (Year: 2008).*

(Continued)

*Primary Examiner* — Arun Goyal
*Assistant Examiner* — William L Breazeal
(74) *Attorney, Agent, or Firm* — Greer, Burns & Crain, Ltd

(57) ABSTRACT

An ion propulsion device including emission modules in an emission plane, each module having an insulating support, an emission electrode on the support, and a conductive liquid with a microfluidic channel depositing conductive liquid on the electrode; an extraction electrode common to the emission modules and facing the modules; and a control unit, in which each module is configured to emit an ion beam (Continued)

when an electric field is applied to the liquid; each control unit controls an ion emission current emitted by applying a potential difference between each emission electrode and the extraction electrode; the emission electrodes are spaced apart by a linear distance that is greater than a distance between two adjacent emission electrodes separated by an empty space; and a length of the insulating support between the electrodes is greater than a propagation distance of an electric leakage current by charge jumping along the support between the electrodes.

15 Claims, 2 Drawing Sheets

(56) References Cited

U.S. PATENT DOCUMENTS

| | | |
|---|---|---|
| 2008/0072565 A1 | 3/2008 | Bekey |
| 2009/0056305 A1 | 3/2009 | Gilchrist et al. |
| 2016/0010631 A1 | 1/2016 | King |
| 2020/0266021 A1 | 8/2020 | Gierak et al. |

OTHER PUBLICATIONS

Marcuccio "Ionic liquid FEEP thruster ion beam characterization" (Year: 2013).*

International Search Report and Written Opinion received for PCT/EP2020/076418, dated Dec. 21, 2020.

French Search Report received for Application No. 1910805, dated Jun. 11, 2020.

Avdienko, A. A., et al., "Flashover in a vacuum," Vacuum, Institute of Nuclear Physics, vol. 27, No. 12, 1977, pp. 643-651.

Battel, S., et al., "High Voltage Engineering Techniques for Space Applications," NESC-Battel Engineering, Workshop Presentation, Apr. 2012, retrieved from http://www.battel-engineering.com, 7 pages.

Dandavino, S., et al., "Microfabricated electrospray emitter arrays with integrated extractor and accelerator electrodes for the propulsion of small spacecraft," J. Micromech. Microeng. 24, 075011, 2014, 13 pages.

Germain, C., et al., "High voltage breakdown in vacuum," Invited Paper, Vacuum, vol. 18, No. 7, 1968, pp. 371-377.

Lozano, P., "Less in Space," American Scientist, vol. 104, 2016, 6 pages.

* cited by examiner

ION PROPULSION DEVICE

BACKGROUND

The present invention relates to an ion propulsion device.

The field of the invention is non-limitatively that of spacecraft propulsion.

For spacecraft such as satellites, various propulsion technologies are known, such as chemical propulsion, cold gas propulsion or electric propulsion.

Miniaturized satellites, such as CubeSats, nanosatellites (1-50 kg) and microsatellites (50-300 kg) are being increasingly used for transmitting information and exploring space.

Unlike conventional satellites, with miniaturized satellites it is possible to considerably reduce the cost associated with deploying them. These satellites are also advantageous in that they have better manoeuvrability.

Appropriate propulsion and control systems are necessary for these small satellites. However, the known propulsion technologies have the drawback whereby they cannot be easily adapted to small satellites, for technical or efficiency reasons. For example, the exhaust velocity of these chemical thrusters is limited by the inherent specific energy released by combustion. Moreover, the fuel tanks and power supply systems for chemical thrusters, or those based on ionized gases, are large and heavy, making them incompatible with the propulsion of miniaturized satellites and small spacecraft.

Thrusters based on electrosprays, referred to as ion thrusters, have been proposed. Electrospray technology is a type of electric propulsion that generates thrust from an ionic liquid by ejecting and accelerating ions in an electrostatic field of the order of a billion volts per metre. An example is that of the thrusters that use field-emission electric propulsion. In particular, this type of thruster is suitable for applications that require thrust values in the range of micro-Newtons to several milli-Newtons to control the orientation and position of spacecraft weighing between 1 kg and 300 kg.

Ion thrusters consist essentially of an emission electrode, which comprises a set of emitters, an extraction electrode, a propellant tank and, in some cases, an acceleration electrode.

An example of a system of this kind is described in P. C. Lozano "*Less in Space*", American Scientist, Volume 104, page 270 (2016). The emission electrode has a plurality of aligned emitters in the form of porous tips infused with ionic liquid, as well as an extraction electrode and an acceleration electrode, the respective openings in which are aligned with the tips.

Another example of an ion thruster system is described in S. Dandavino et al., "*Microfabricated electrospray emitter arrays with integrated extractor and accelerator electrodes for the propulsion of small spacecraft*", J. Micromech. Microeng., 24, 075011 (2014), in which the emitters comprise a capillary microtube for supplying the propellant liquid to the end thereof, from where the propellant liquid is ionized.

A potential difference V of the order of 1-10 kV is applied to generate a strong local electric field at the tip of the emitter. This electric field deforms the liquid-propellant film into a conical structure referred to as a Taylor cone, located at the tip of the emitter, and extracts charged particles at the apex of the cone. The charged particles are then accelerated at high speeds of the order of several tens of kilometres per second by the applied electric field.

The thrust of an ion thruster depends on the flux, or emission current I, and on the velocity of the ions ejected thereby. The operation of a thruster can be characterized by a function I/V. For a thruster of this kind to function efficiently, the flux and the speed of the ejected ions must be controlled.

However, the known electric propulsion techniques require control and supply systems with complex and bulky electrical connections.

SUMMARY

An aim of the present invention is to propose an ion propulsion device that is capable of adapting to a wide variation in the thrust required.

Another aim of the present invention is to propose an ion propulsion device that is capable of adapting to a wide variation in the size and weight of spacecraft.

Yet another aim of the present invention is to propose an ion propulsion device that allows for prolonged operation thereof without any depletion of the emitted ionic species and thus without any build-up of counterions in the thruster.

At least one of these aims is achieved with an ion propulsion device, the device comprising:

a plurality of emission modules arranged in an emission plane of the device, each emission module comprising an insulating support, an emission electrode arranged on the insulating support, and a tank of conductive liquid with a microfluidic channel arranged to deposit conductive liquid on the emission electrode, an extraction electrode common to the plurality of emission modules and arranged opposite the emission modules, and at least one control unit, in which:

each emission module is configured to emit an ion beam when an electric field is applied to the conductive liquid, the at least one control unit is configured to control an emission current of the ions emitted by the application of a potential difference between at least one emission electrode and the extraction electrode, the emission electrodes of the emission modules are spaced apart from one another by a linear distance l greater than a breakdown distance between two adjacent emission electrodes separated by an empty space, and a length L of the insulating support between the emission electrodes is greater than a propagation distance of an electric leakage current by hopping conduction along the insulating support between the emission electrodes, the linear distance l and the length L of the insulating support are chosen so as to maximize the number of emission modules in the emission plane.

The ion propulsion device according to the invention is a modular device produced with a plurality of separate or single emission modules, or basic modules, arranged in an emission plane of the device. These emission modules may for example adopt the form of flat elements, such as slabs. These slabs may have a square or rectangular shape so as to be easily placed side by side. Each emission module incorporates a tank of conductive liquid and a microfluidic system arranged to deposit conductive liquid on the emission electrode. Each emission module is operational alone, in combination with the extraction electrode and the control module. Thus, the device according to the invention adopts a parallelable architecture in which each basic module can be individually controlled.

By virtue of its modular character, the device according to the invention has the advantage of being able to adapt to a change in the order of magnitude of the demand in terms of size or power. The useful surface or propulsion surface may be adapted to accommodate surfaces of spacecraft of variable size. Thus, the device according to the invention has a very small bulk with respect to its propulsion surface, and therefore the number of ion beams emitted.

When adjacent emission electrodes are subjected to an electric potential difference, breakdowns and/or leakage currents can occur.

Advantageously, on the one hand, the emission electrodes of the emission modules are spaced apart from one another by a linear distance l greater than a breakdown distance between two adjacent emission electrodes separated by an empty space. This breakdown distance corresponds to a propagation distance of the electric arc ("breakdown") between two adjacent emission electrodes separated by an empty space (with very low pressure conditions).

On the other hand, the length L of the insulating support between the emission electrodes is greater than a propagation distance of an electric leakage current by hopping conduction (also referred to as surface flashover) along the insulating support between the emission electrodes.

The linear distance l and the length L of the insulating support are chosen or determined so as to maximize the number of emission modules in the emission plane.

In other words, the modules are arranged so as to avoid breakdowns and leakage currents between the respective emission electrodes, while maximizing the number of modules in the emission plane, making it possible to obtain an efficient device with a minimized bulk.

In fact, it is necessary to provide for a minimum linear distance to separate two electrodes subjected to a potential difference in order to avoid breakdowns between these electrodes. This minimum distance depends on the potential difference between the emission electrodes of two adjacent emission modules. The modules are mechanically and electrically separated (i) by their insulating supports and also (ii) by an empty space or gap between the emission electrodes.

In order to estimate (i) the length of the insulating support to be provided between two modules to avoid a leakage of current at the surface of the support, a design rule is applied specifying the provision of an insulator length of 1 mm per kilovolt of difference in voltage applied between two adjacent emission modules (see article by A. A. Avdienko et al., "*Flashover in a vacuum*", Vacuum, volume 27, number 12, 1977).

In order to estimate (ii) the length of the empty space or the gap separating two contiguous modules so as to avoid the "breakdown" effect, a second design rule is applied specifying the provision of a gap width equal to 1 mm per 10 kilovolts of difference in voltage applied between two adjacent emission modules (see the article by C. Germain et al., "*High voltage breakdown in vacuum*", Vacuum, volume 18, number 7, 1968).

The control unit is configured to control an emission current of the ions emitted by application of a potential difference between at least one emission electrode and the extraction electrode. Thus, for each emission module, a set emission current is given and is achieved by adjusting the potential difference applied. The value of the current emitted is measured by means of a device for measuring the amperage of the electric current delivered, placed in the high-voltage generator.

The device according to the invention comprises an extraction electrode common to the plurality of emission modules. The extraction electrode is arranged opposite the emission modules so that a part of the extraction electrode is located directly facing each emission electrode.

By virtue of the fact that there is only one common extraction electrode for all the modules, the bulk of the ion propulsion device according to the invention is considerably reduced with respect to devices of the state of the art. In fact, a single electrical connection is sufficient to apply the desired potential to the extraction electrode. The device does not require a plurality of extraction electrodes with their electrical connections and the distances and thicknesses of insulation necessary for these connections.

Therefore, the costs of incorporating such a device are reduced with respect to thrusters of the state of the art requiring individual interconnections.

In addition, the device according to the invention can be assembled easily. There is no need for the extraction electrode to be arranged specifically with respect to the emission electrodes.

Provision can be made for a control unit for one or more emission modules. The control unit thus makes it possible to control one or more emission modules. It thus controls the supply and management of the thrust. It can also have a functionality of diagnosis (for example, to monitor the chemical state of the conductive liquid) and communication.

According to an advantageous embodiment, the linear distance l may be less than the propagation distance of an electric leakage current by hopping conduction along the insulating support between the emission electrodes.

In other words, the modules are spaced out so as to avoid breakdowns between their respective emission electrodes, but the linear distance between the electrodes is less than the extent of the insulating support surface between two adjacent electrodes. Thus, even for the emission modules arranged very close together, there is no risk of surface flashover between adjacent modules.

According to an embodiment, the emission modules may be configured to be juxtaposed in order to form a propulsion surface of variable size. By virtue of the scalability of the device, propulsion surfaces considerably larger than the surfaces according to the state of the art can be obtained.

According to an example, the size of the propulsion surface formed by the juxtaposed emission modules may be comprised between 100 $mm^2$ (for example 10 mm×10 mm) and several $m^2$.

Particularly advantageously, the juxtaposed emission modules may form an integrated or connected unit. An ion propulsion device according to the invention can thus be produced with one or more of these integrated units.

According to an embodiment, when the device is in operation, at least one emission module may emit an ion beam and at least one emission module does not emit a beam.

In fact, it may be useful not to operate all of the modules simultaneously when the device is in operation. Thus, the modules that are not operating can be reserved for the circumstances where the required demand for thrust can be satisfied by activating a limited number of modules, or even in the circumstances where another module is unable to operate, for example when the local reserve of conductive liquid is degraded. Modules can then be stopped and others can be started without the propulsion device having down time when it is in operation.

Advantageously, the ion source may comprise a tank for conductive liquid connected to the emission electrode. Implementing an ion propulsion device having a given propulsion surface is thus particularly facilitated.

Each emission electrode may comprise a planar substrate comprising a plurality of emitters.

The substrate can be constituted, for example, by a silicon plate.

According to an example, each emitter may be constituted by at least one nanowire, the nanowires extending essentially towards the extraction electrode.

The nanowires may be placed over the entire upper surface of the substrate, covering the whole of the upper surface of the emission electrode.

Advantageously, an emitter may be constituted by a plurality of nanowires forming a bundle.

These bundles may form spontaneously when the nanowires are infused or immersed in the conductive liquid.

The bundles allow a good flow of the conductive liquid through the nanowires by capillarity. Thus there is no counterion accumulation effect at the emitters, allowing prolonged emission of an ion beam of the same polarity.

According to an embodiment, the extraction electrode may comprise either a grid of plaited metal wires, or a metal plate comprising openings.

These types of extraction electrodes can be produced easily by plaiting, pressure forming or electro-erosion respectively, in variable sizes and shapes and at reduced cost. There is no need for the openings of the extraction electrode to be aligned with the emitters of the emission electrodes.

According to a particularly advantageous embodiment, when the device is in operation, a part of the emission modules may be configured to emit an ion beam of opposite polarity with respect to the polarity of the ion beam emitted by another part of the emission modules.

According to a first example, the device according to the invention may be configured to emit positively-charged ions and negatively-charged ions so that there is the same quantity of positive charges as negative charges. Thus, the ion plume emitted by the propulsion device, resulting from all the ion beams emitted, is electrically neutral. This makes it possible to avoid the charged particles coming back onto the device and the spacecraft in which it is installed, which could contaminate or damage the device or the spacecraft.

According to a second example, by making the emission modules operate with opposite polarities at the same time, it is possible to produce the charge neutrality of the spacecraft with which the device is utilized, by ensuring that the total of the currents emitted and collected by the spacecraft is equal to zero. This neutrality contributes to protecting the spacecraft from a charge accumulation that could lead to discharges or compromise other physical measurements carried out on board.

Advantageously, the device according to the invention may be implemented in a satellite, in particular of the CubeSat type, a nanosatellite (1-50 kg) or a microsatellite (50-300 kg).

In fact, the device according to the invention makes it possible to free space for the payload of the satellites by virtue of its reduced bulk.

BRIEF DESCRIPTION OF THE DRAWINGS

Other advantages and characteristics will become apparent on examination of the detailed description of examples that are in no way limitative, and from the attached drawings in which:

FIG. 1b is an enlargement of details in FIG. 1a;

FIG. 2b shows an enlargement of the emission electrode in FIG. 2a; and

DETAILED DESCRIPTION

It is well understood that the embodiments that will be described hereinafter are in no way limitative. It is possible in particular to envisage variants of the invention comprising only a selection of the characteristics described hereinafter, in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In particular, all the variants and all the embodiments described can be combined together if there is no objection to this combination from a technical point of view.

In the figures, the elements common to several figures retain the same reference.

Figure 1A:
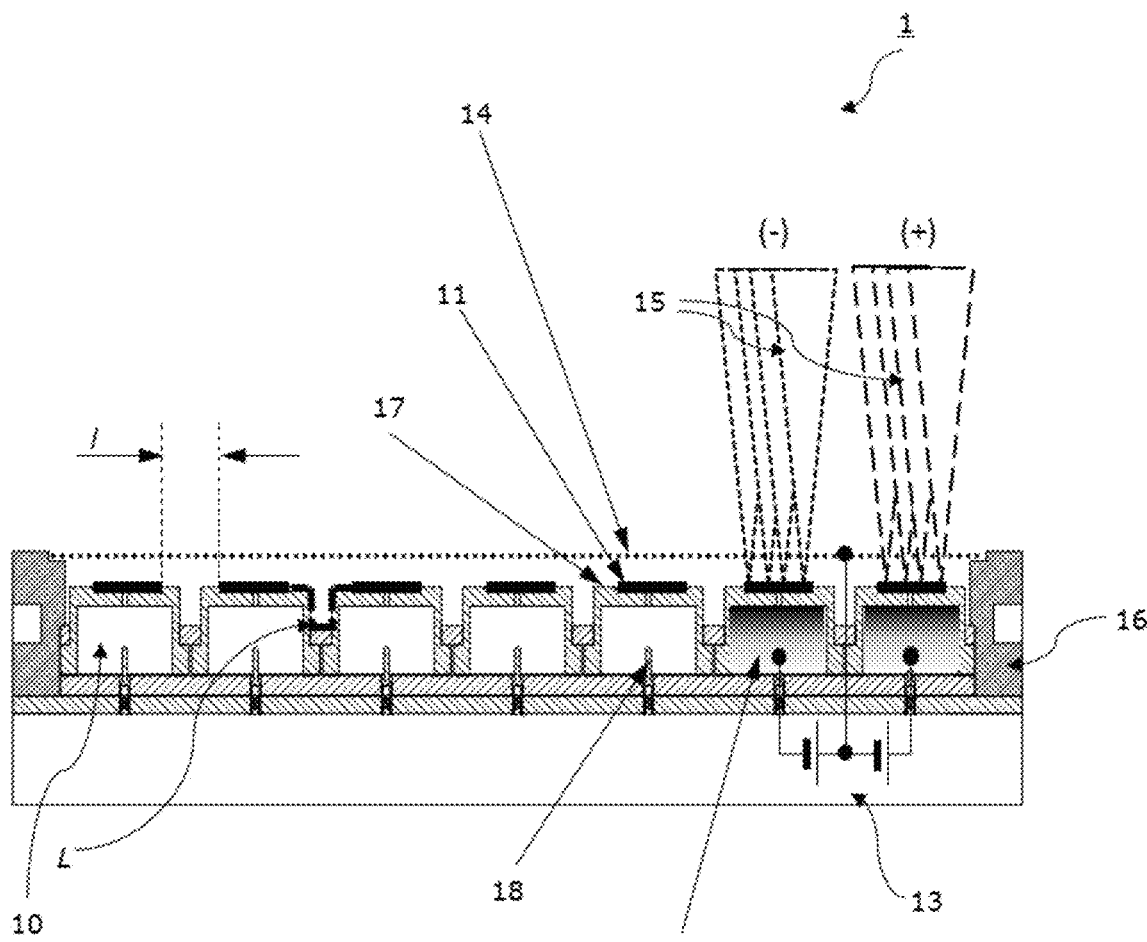
FIG. 1a is a diagrammatic representation of a non-limitative example embodiment of an emission module of a device according to the invention.

FIG. 1a is a diagrammatic representation of an example of an ion propulsion device, shown in cross section, according to an embodiment of the invention.

The view of the device 1 as illustrated in FIG. 1a shows seven emission modules 10. For example, this may concern an example device 1 having 7×7 emission modules 10. Of course, the device 1 can comprise a different number of emission modules.

Each emission module 10 comprises an emission electrode 11 comprising emitters in the form of tips (not shown). Advantageously, the emission electrode comprises a planar substrate or a plate.

Figure 2A:
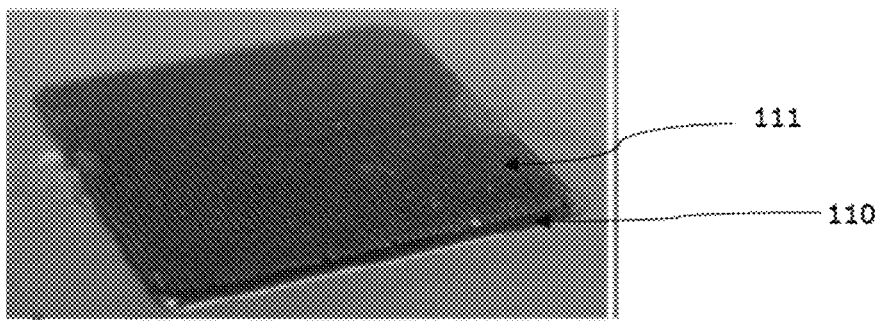
FIG. 2a shows an example embodiment of an emission electrode of a device according to the invention.

An example embodiment of an emission electrode is shown in FIG. 2a. According to this example, the emission electrode comprises a substrate 110 or a plate comprising a plurality of emitters 111.

The substrate of the emission electrode 11 is made from an electrically insulating or semiconductive material. This is for example a plate containing crystalline silicon. Of course, other materials suitable for growing nanowires, such as the silica glasses, the borosilicate glasses or combinations of layers of these materials, can be used for the substrate.

The device 1 according to the invention also comprises an extraction electrode 14. The extraction electrode 14 is common to all the emission modules 10 of the device 1 according to the invention.

Each module 10 also comprises a tank 12 of conductive liquid on which the emission electrode 11 is arranged. The tank 12 of conductive liquid constitutes an ion source. It can contain a determined amount of conductive liquid. The conductive liquid can be, for example, an ionic liquid, a liquid rendered conductive, or a liquid or molten metal. The liquid is passively diffused on the emission electrode 11, for example through openings in the substrate 110, even when there is no potential applied between the electrodes 11, 14.

The tank 12 is made from a dielectric material, for example an epoxide polymer material, optionally reinforced by glass fabric, or polyether ether ketone (PEEK). The set of tanks 12 of a device 1 can be constituted by a dielectric plate in which cavities are provided. Alternatively, as illustrated for the embodiment in FIG. 1a, the single tanks 12 can be juxtaposed in the device 1.

The tank 12 thus constitutes an insulating support 17 for the emission electrode 11.

For each emission module 10, the tank 12 is connected to the emission electrode 11. Assembly of the reservoir 12 with the emission electrode 11 can, for example, be carried out by bonding, screwing or welding.

The extraction electrode 14 is made from an electrically conductive material. This material can be, for example, a metal such as tungsten, stainless steel, molybdenum or tantalum.

In the example embodiment shown in FIG. 1a, the extraction electrode 14 is formed by a grid of plaited metal wires. The grid can have a mesh constituted by wires of approximately 50 to 80 µm diameter, spaced apart by approximately 100 µm. Alternatively, the extraction electrode can be a metal plate having openings.

In both cases, it is not necessary for an opening of the extraction electrode to be positioned exactly facing an emitter of the emission electrode.

The conductive liquid forms a pool of liquid on the upper surface of the emission electrode 11. In order to polarize this pool, an immersed polarization electrode 18 can be provided in each tank, as illustrated in FIG. 1a. When an electric field is generated between the two electrodes 11, 14 by application of an electric potential difference, a very strong local electric field (of the order of $10^9$ V/m) is generated at the emitters, which causes the conductive liquid to form a Taylor cone situated over a plurality of tips of the emission electrode 11. Ions are then emitted at the apex of each cone, forming an ion beam 15 for each module 10 in operation. The charged particles are then accelerated at high speeds of the order of several tens of kilometres per second by the applied electric field. The polarity of the ion beam is determined by the sign of the electric field created between the electrodes 11, 14. FIG. 1a illustrates two ion beams 15 of opposite polarity.

The operation of a propulsion device can be characterized by a function I(V) where I is the emission current of the emitted ions and V is the potential difference applied between the electrodes. On this curve, the point of stable operation is reached after a certain stabilization time.

The ion propulsion device 1 also comprises a control unit 13. The control unit 13 can be common to several modules 10 or even to all the modules 10 of the device 1. Alternatively, each emission module 10 can have its own control unit 13.

The control unit 13 is configured to apply the potential difference between the emission electrodes 11 and the extraction electrode 14. To this end, the control unit 13 comprises in particular a high-voltage electricity generator, shown in FIG. 1a by an electrical diagram for two of the modules. The electricity generator is configured to generate the voltage necessary for the potential difference and to allow a polarity inversion between its terminals.

The control unit 13 also comprises an electronic module configured to control ion emission such as the flux and the velocity of the particles emitted, and to monitor the chemical characteristics of the conductive liquid. The electronic module can comprise, for example, an on-board platform, such as a microcomputer, a digital electronic circuit and/or software means. The electronic module can also comprise a communication means.

One or more emission modules 10 can be fixed on a control unit 13 by epoxy bonding, or by any other suitable means. In the embodiment shown in FIG. 1a, the control unit 13 is represented by an integrated unit.

The device 1 comprises an outer case 16 (or a housing) in which the emission modules 10, the extraction electrode 14 and, optionally, the control unit 13 are arranged. The case 16 is at the chassis potential (0 V).

Figure 1B:
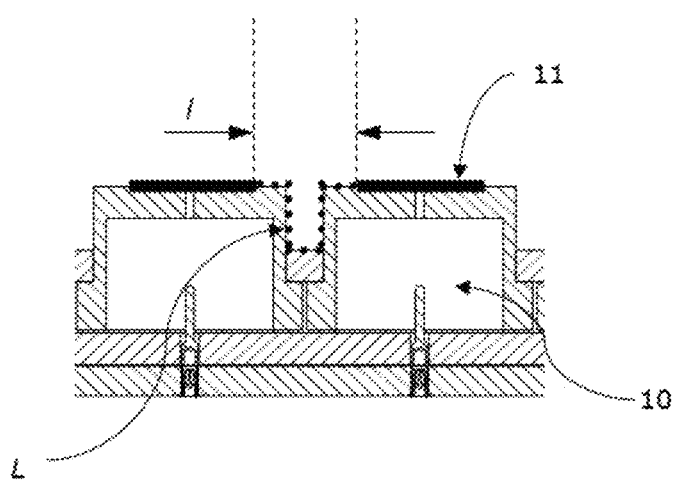

FIG. 1b shows an enlargement of a part of the device 1 shown in FIG. 1a. FIG. 1b displays the distances between two emission electrodes, which will be described hereinafter.

The emission electrodes 11 of the emission modules 10 are arranged in relation to one another so that the length L of their insulating support 17 between two adjacent emission electrodes is greater than the propagation path of an electric leakage current between these adjacent electrodes. In other words, the modules are spaced apart so as to avoid breakdowns and leakage currents between their respective emission electrodes.

This can be carried out, for example, by providing for a groove or even a series of corrugations of the insulating surface between two adjacent emission modules, as illustrated for the embodiment shown in FIG. 1a. The linear distance l between two emission electrodes 11 can thus be chosen to be less than the distance travelled by electrons on the dielectric material through the hopping conduction mechanism, and thus less than the extent L of the insulating surface between two adjacent modules. The length of the path to be travelled by the electrons in the dielectric material can be increased by increasing the depth of the groove between two emission modules.

Figure 2B:
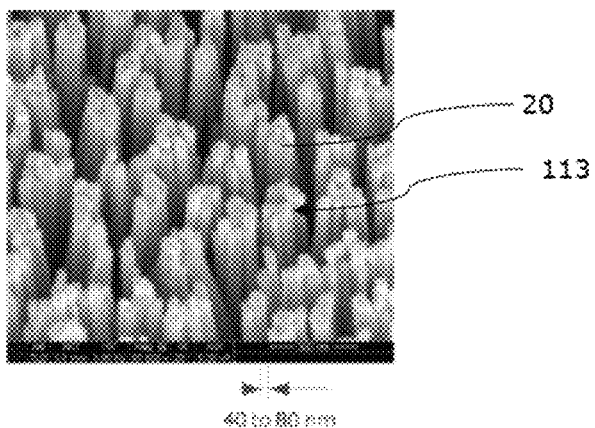

FIG. 2b shows an enlargement of the surface of an emission electrode, such as that in FIG. 2a, comprising a plurality of nanowires 113. No conductive liquid is shown on this photograph taken with an electron microscope.

The nanowires 113 extend essentially towards the extraction electrode and cover the whole of the microstructured substrate.

Like the substrate 110, the nanowires 113 are made from an electrically insulating or semiconductive material. This material can be for example crystalline gallium nitride (GaN), or any other suitable material.

The nanowires can be produced by molecular epitaxy on the substrate. For a given method, the diameters of the nanowires vary very little. The diameter of the nanowires can be, for example, between 40 and 80 nm. A material addition production process such as epitaxy makes it possible to obtain densities of nanowires of the order of $10^9/cm^2$.

An emitter site can be constituted by a plurality of nanowires, for example by 5 to 10 nanowires, this number varying according to the aspect ratio (diameter/length of the wires), the density of the wires and the Young's modulus (mechanical stiffness) of the material constituting the nanowires.

In the example shown in FIG. 2b, the nanowires form groups in the form of bundles 20. These groups can form when the pool of ionic liquid is deposited on the emission electrode or when a potential difference is applied between the emission electrode and the extraction electrode.

Each bundle 20 can constitute an emitter. Each bundle 20 can contain several nanowires 113 or several tens of nanowires 113, as shown in the photo in FIG. 2c. The bundles 20 allow renewal of the conductive liquid at the ends of the nanowires 113. The conductive liquid flows between the nanowires by capillarity. Thus, there is no counterion accumulation effect at the Taylor cones, which promotes prolonged operation, for example over several hours, without the need to invert the polarity of the emission module and without degrading the conductive liquid.

According to a preferred embodiment, the device 1 according to the invention comprises a plurality of emission modules 10. The device 1 also comprises an extraction electrode 14 common to all the emission modules 10 as well as one or more control units 13. The emission modules 10 are configured to be juxtaposed beside one another. The emission modules 10 can for example have a square cross section in the plane of the extraction electrode 14. Of course, the cross section can also be rectangular.

The emission modules 10 are preferably arranged so as to form flat elements, such as slabs. These slabs can easily be combined with an extraction electrode as well as one or more control units. Such an assembled device has a very small bulk.

Figure 3:
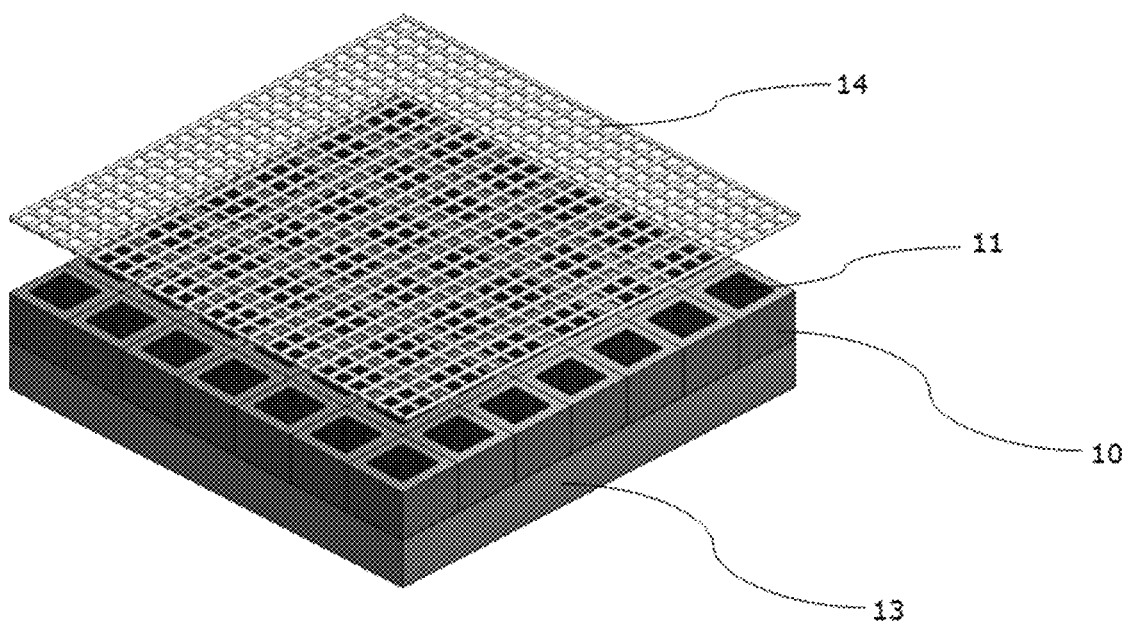
FIG. 3 is a diagrammatic representation of a propulsion device according to an embodiment.

An example of a propulsion device according to the invention is illustrated in FIG. 3. In this example, the device comprises an assembly of 7×7 emission modules 10, arranged on a control unit 13 and placed opposite a single extraction electrode 14.

According to an example, the size of the propulsion surface formed by the juxtaposed emission modules can be comprised between 100 mm$^2$ and several m$^2$. The device can be integrated into spacecraft of all sizes.

According to an embodiment, the juxtaposed emission modules can form an integrated or connected unit. To this end, it is for example possible to combine them with a single common control unit, or to form emission units with a single substrate.

Alternatively, the emission modules can be independent modules. Thus, it is possible to easily extract one or more modules from the device, for example for replacing them in the event of failure.

When the ion propulsion device is in operation, at least one emission module emits an ion beam and at least one emission module does not emit a beam. The module or modules that are not operating can thus be reserved for the circumstances where another module is unable to operate, for example when the local reserve of conductive liquid is degraded. Modules can then be stopped and others can be started without the propulsion device having down time when it is in operation. This makes it possible to emit ions during an extended period.

Similarly, when the ion propulsion device is in operation, a part of the emission modules can be configured to emit an ion beam of opposite polarity with respect to the polarity of the ion beam emitted by another part of the emission modules.

According to a first example, the device can be configured to emit positively-charged ions and negatively-charged ions at the same time so that the ion plume emitted by the thruster resulting from all the emitted ion beams is electrically neutral.

According to a second example, by making the emission modules operate with opposite polarities at the same time, it is also possible to produce the charge neutrality of the spacecraft bearing the propulsion device. To this end, the total of the currents emitted and collected by the spacecraft must be equal to zero.

Of course, the invention is not limited to the examples that have just been described and numerous adjustments can be made to these examples without departing from the scope of the invention.

The invention claimed is:

1. An ion propulsion device, the device comprising:
   a plurality of emission modules arranged in an emission plane of the device, each said emission module comprising an insulating support, an emission electrode arranged on the insulating support, and a tank of conductive liquid with a microfluidic channel arranged to deposit conductive liquid on the emission electrode;
   an extraction electrode common to the plurality of emission modules and arranged opposite the plurality of emission modules; and
   at least one control unit;
   wherein:
   each said emission module is configured to emit an ion beam when an electric field is applied to the conductive liquid;
   the at least one control unit is configured to control an emission current of the ions emitted by application of a potential difference between at least one emission electrode of the plurality of emission electrodes and the extraction electrode;
   the emission electrodes of the plurality of emission modules are spaced apart from one another by a linear distance lgreater than a breakdown distance between two adjacent emission electrodes separated by an empty space, the linear distance l being less than the propagation distance of an electric leakage current by hopping conduction along the insulating support between the emission electrodes; and
   a length L of an insulating support between the emission electrodes is greater than a propagation distance of an electric leakage current by hopping conduction along the insulating support between the emission electrodes, the linear distance l and the length L of the insulating support being chosen so as to l maximize the number of the plurality of emission modules in the emission plane.

2. The ion propulsion device according to claim 1, characterized in that the plurality of emission modules are configured to be juxtaposed in order to form a propulsion surface of variable size.

3. The ion propulsion device according to claim 2, characterized in that the juxtaposed plurality of emission modules form an integrated or connected unit.

4. The ion propulsion device according to claim 2, characterized in that the size of the propulsion surface is comprised between 100 mm2 and several m2.

5. The ion propulsion device according to claim 1, characterized in that when the device is in operation, at least one emission module emits an ion beam and at least one emission module does not emit a beam.

6. The ion propulsion device according to claim 1, characterized in that each emission electrode comprises a planar substrate comprising a plurality of emitters.

7. The ion propulsion device according to claim 6, characterized in that the substrate is made from crystalline silicon, glass or alternate layers of these materials.

8. The ion propulsion device according to claim 6, characterized in that each emitter is constituted by a plurality of nanowires, the plurality of nanowires extending essentially towards the extraction electrode and covering a whole of the upper surface of the substrate.

9. The ion propulsion device according to claim 8, characterized in that an emitter is constituted by the plurality of nanowires forming a bundle.

10. The ion propulsion device according to claim 1, characterized in that the extraction electrode comprises
   a grid of plaited metal wires, or
   a metal plate comprising openings.

11. The ion propulsion device according to claim 1, characterized in that when the device is in operation, a part of the plurality of emission modules is configured to emit an ion beam of opposite polarity with respect to the polarity of the ion beam emitted by another part of the plurality of emission modules.

12. The ion propulsion device according to claim 11, characterized in that the device is configured to emit positively-charged ions and negatively-charged ions so that there is the same quantity of positive charges as negative charges.

13. The ion propulsion device according to claim 11, characterized in that the device is configured to emit positively-charged ions and negatively-charged ions so that the total of the currents emitted and collected by a spacecraft in which the device is implemented is equal to zero.

14. A satellite, comprising an ion propulsion device according to claim 1.

15. The satellite of claim 14, wherein the satellite is of the CubeSat type.

* * * * *